United States Patent [19]
Chuang

[11] Patent Number: 5,370,441
[45] Date of Patent: Dec. 6, 1994

[54] BABY CHAIR FOR WHEELED CYCLES

[76] Inventor: Shi-Wen Chuang, 11F-1, No. 367, Gong Yi Road, Taichung, Taiwan, Prov. of China

[21] Appl. No.: 191,331

[22] Filed: Feb. 3, 1994

[51] Int. Cl.⁵ .............................................. A47C 1/08
[52] U.S. Cl. .............................. 297/250.1; 297/195.13; 297/243
[58] Field of Search .......... 297/195.13, 250.1, 256.16, 297/243, 423.4; 280/202; 224/32 A, 30 R

[56] References Cited

U.S. PATENT DOCUMENTS

| 1,081,326 | 12/1913 | Parker | 297/195.13 X |
| 4,030,684 | 6/1977 | Johnson et al. | 297/243 X |
| 4,053,091 | 10/1977 | Martelet | 297/243 X |

FOREIGN PATENT DOCUMENTS

| 121615 | 10/1930 | Austria | 297/243 |
| 232800 | 8/1987 | European Pat. Off. | 297/195.13 |
| 9779 | 7/1923 | Netherlands | 297/195.13 |

Primary Examiner—Laurie K. Cranmer
Attorney, Agent, or Firm—Charles E. Baxley

[57] ABSTRACT

A baby chair is disposed on a rack of a wheeled cycle for supporting children and includes a board fixed on the rack, the chair further includes a cushioning device disposed between the chair and the rack for cushioning the chair in order to absorb shocks and vibrations transmitted to the chair body, the children seated on the chair may feel comfortable and will not be hurt by the shocks and vibrations.

4 Claims, 3 Drawing Sheets

BABY CHAIR FOR WHEELED CYCLES

BACKGROUND OF THE INVENTION

1. Field of the Invention

The present invention relates to a baby chair, and more particularly to a baby chair for wheeled cycles.

2. Description of the Prior Art

Typical baby chairs for wheeled cycles, such as bicycles, are directly disposed on the rack of the wheeled cycles without any cushioning means such that the vibrations or shocks transmitted to the cycles will be transmitted to the children seated on the chair, the children, particularly the brain portion of the children will be hurt by the shocks or vibrations.

The present invention has arisen to mitigate and/or obviate the afore-described disadvantages of the conventional baby chairs for wheeled vehicles.

SUMMARY OF THE INVENTION

The primary objective of the present invention is to provide a baby chair for wheeled vehicles which includes means for cushioning purposes such that the children seated on the chair may feel comfortable and will not be hurt by the shocks and vibrations.

In accordance with one aspect of the invention, there is provided a baby chair for a wheeled cycle comprising a chair body disposed on the wheeled cycle, and means for cushioning the chair body in order to absorb shocks and vibrations transmitted to the chair body. A board is disposed on the wheeled cycle, the chair body has a front portion pivotally coupled to the board, the cushioning means is disposed between the rear portion of the board and of the chair body.

The rear portion of the board includes at least one recess formed therein, the rear portion of the bottom surface of the chair body includes at least one cavity, the cushioning means includes at least one spring engaged in the recess and the cavity for biasing the chair body. The chair body includes at least one bolt extended downward from the cavity, extended downward through the spring and extended downward beyond the board, and a pad engaged with the bolt for engaging with the board so as to limit movement of the spring.

The front portion of the board includes a hook for engaging with a rack of the wheeled cycle, a catch pivotally secured to the rear portion of the board, and means for biasing the catch to engage with the rack so as to secure the board on the rack. The board includes an upper portion having a handle pivotally supported thereon, and a lower portion having a panel pivotally secured thereto and fixed to the handle such that the handle and the panel rotated in concert, the panel is rotated to engage with the rack by the handle so as to secure the board to the rack. The board includes two stubs oppositely extended upward and downward therefrom, the handle and the panel are rotatably engaged with the stubs respectively, the board includes two grooves oppositely formed therein and having a curvature center located at the stubs, and two pins fixing the panel to the handle and slidably engaged in the grooves such that the handle and the panel rotated in concert.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
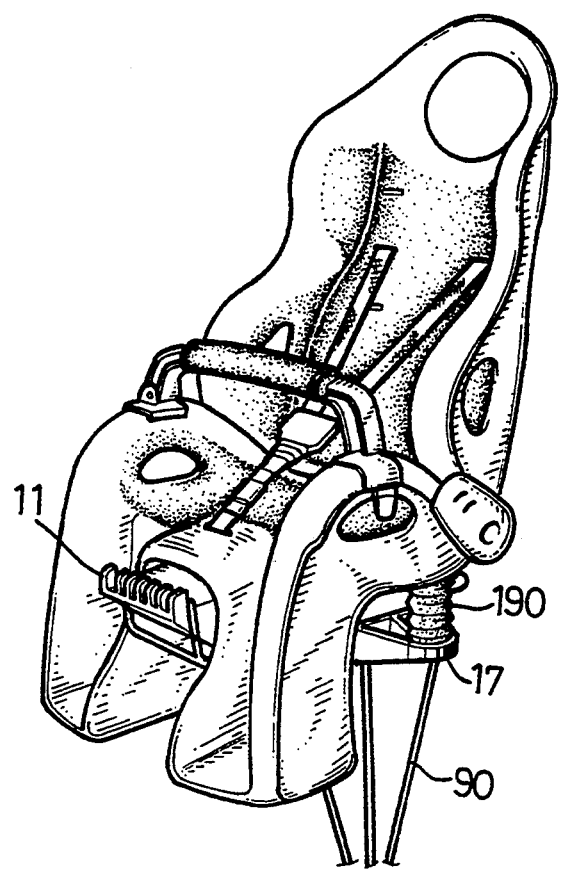
FIG. 1 is a perspective view of a baby chair for wheeled cycles in accordance with the present invention.
Figure 3:
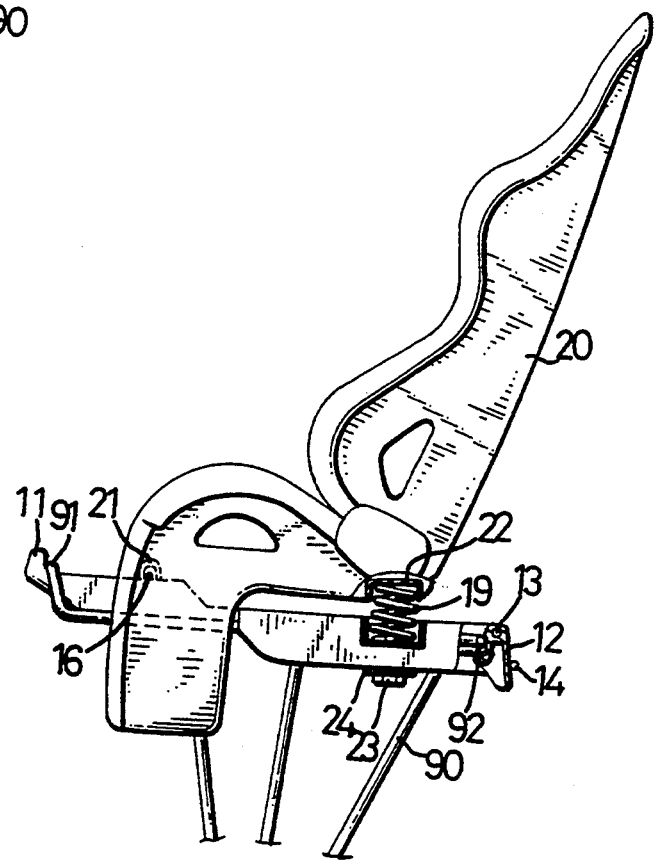
FIG. 3 is a partial cross sectional view of the baby chair.
Figure 2:
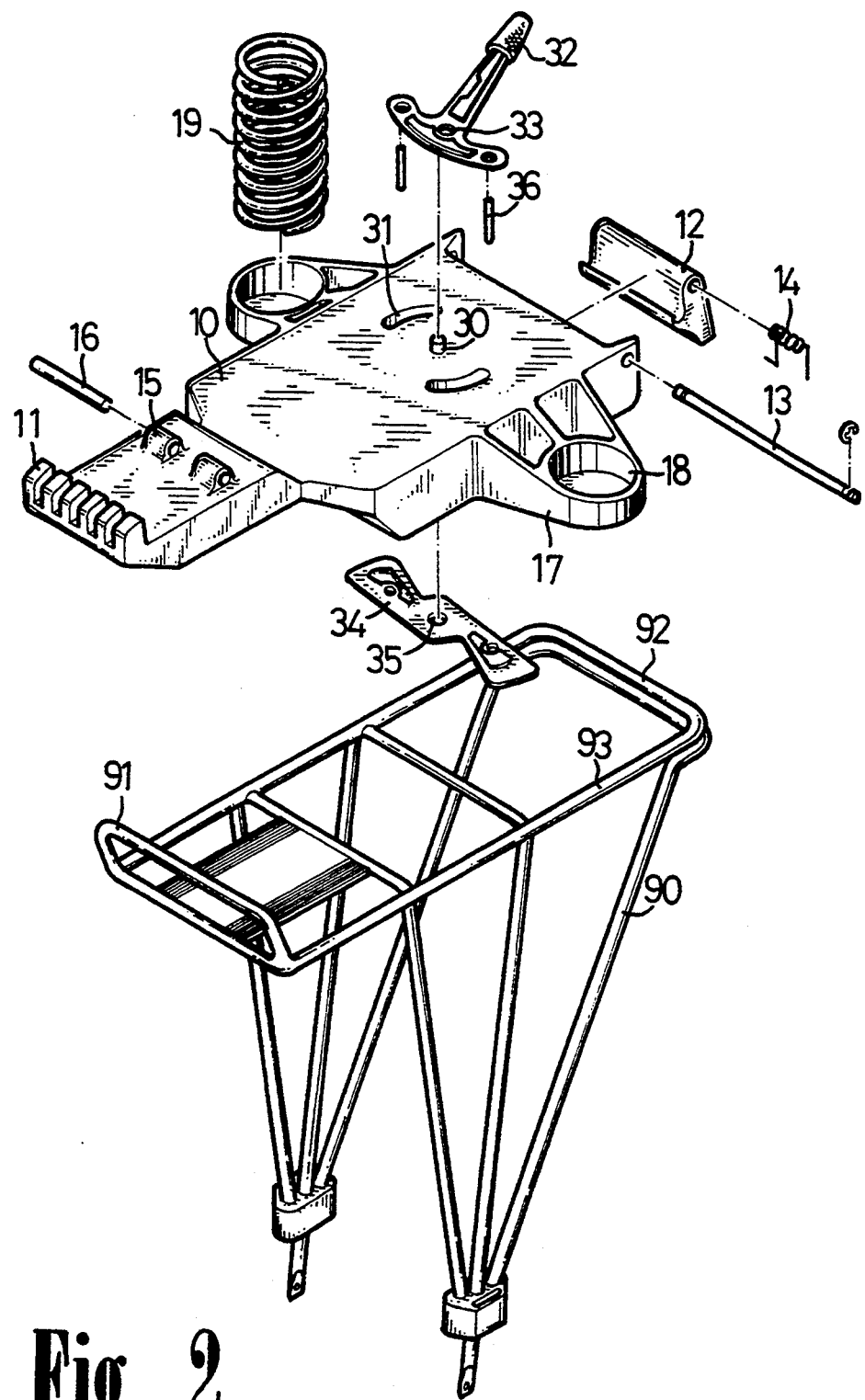
FIG. 2 is an exploded view of the baby chair.

Referring to the drawings, and initially to FIGS. 1 to 3, a baby chair in accordance with the present invention is designed to be disposed on the rack 90 of a wheeled cycles, such as bicycle, the rack 90 includes a front bar 91, a rear bar 92 and two side bars 93, the baby chair comprises a board 10 including a hook 11 formed in the front portion for engaging with the front bar 91 of the rack 90, a catch 12 pivotally secured to the rear portion of the board 10 at a pin 13, a spring 14 engaged on the pin 13 and engaged with the catch 12 for biasing the catch 12 to engage with the rear bar 92 of the rack 90 such that the board 10 can be secured to the rack 90 (FIG. 3); the board 10 includes two lumps 15 having a shaft 16 engaged therein, two ears 17 oppositely extended outward from the rear portion thereof and each having a recess 18 formed therein, a spring 19 engaged in each of the recesses 18.

A chair body 20 includes a lump 21 extended downward and engaged between the lumps 15 and rotatably engaged with the shaft 16 such that the chair body 20 has a front portion pivotally coupled to the board 10, two cavities 22 oppositely formed in the rear portion of the bottom surface of the chair body 20 for engaging with the springs 19, a bolt 23 extended downward from each of the cavities 22, extended through the springs 19 and extended downward beyond the ears 17 of the board 10, and two pads 24 engaged with the bolts 23 for engaging with the ears so as to limit the movement of the springs 19, whereby, the springs 19 form a cushioning means for absorbing the shocks or vibrations transmitted to the chair body 20 such that the children seated on the chair may feel comfortable and will not be hurt by the shocks and vibrations. It is preferable that a rubber sleeve 190 is provided around each of the springs 19 for protecting the springs.

Figure 4:
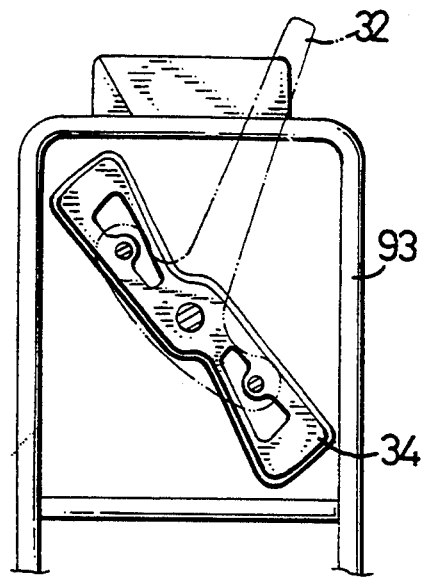
FIG. 4 and 5 are schematic views illustrating a securing means for the baby chair.
Figure 5:
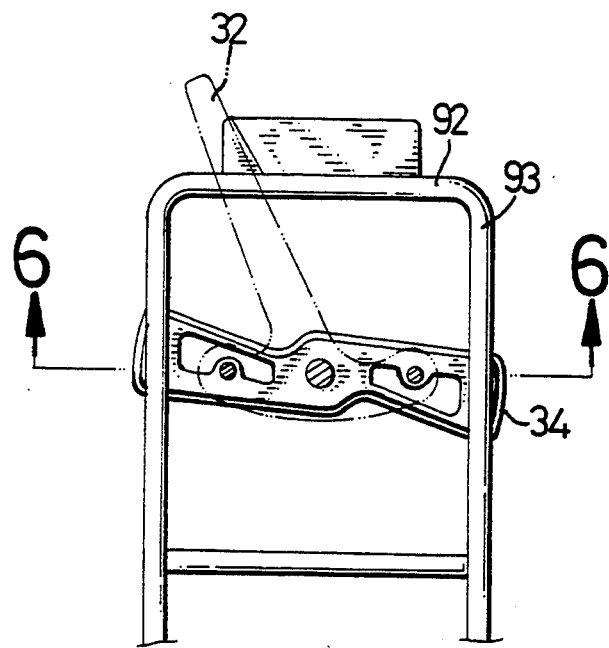
Figure 6:
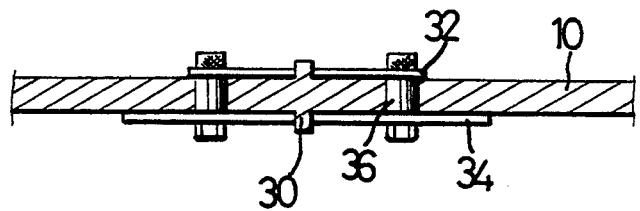
FIG. 6 is a cross sectional view taken along lines 6—6 of FIG. 5.

Referring next to FIGS. 4 to 6, and again to FIG. 2, another securing means is provided for securing the board 10 to the rack 90, the means comprises two stubs 30 extended upward and downward from the rear portion of the board 10, two grooves 31 oppositely formed in the board 10 and having a curvature center located in the stubs 30, a handle 32 including a hole 33 engaged with the upper stub 30, a panel 34 including a hole 35 engaged with the lower stub 30, two pins 36 fixing the panel 34 to the handle 32 and slidably received in the grooves 31 of the board 10 such that the panel 34 and the handle 32 rotate in concert about the stubs 30. As best shown in FIGS. 5 and 6, when the handle 32 is rotated for a suitable angle, the end portions of the panel 34 are caused to engage with the side bars 93 of the rack such that the board 10 can further be secured to the rack of the wheeled cycles.

Accordingly, the baby chair in accordance with the present invention includes a cushioning means for absorbing the vibrations or shocks transmitted to the baby chair such that the children seated on the chair may feel comfortable and will not be hurt by the shocks and vibrations.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A baby chair for a wheeled cycle comprising a board disposed on said wheeled cycle and including a front portion and a rear portion, said rear portion of said board including at least one recess formed therein, a chair body including a bottom surface having a front portion pivotally coupled to said board and having a rear portion, said rear portion of said bottom surface of said chair body including at least one cavity, means disposed between said rear portion of said board and said rear portion of said chair body for cushioning said chair body in order to absorb shocks and vibrations transmitted to said chair body, said cushioning means including at least one spring engaged in said recess and said cavity for biasing said chair body, said chair body including at least one bolt extended downward from said cavity, extended downward through said spring and extended downward beyond said board, and a pad engaged with said bolt for engaging with said board so as to limit movement of said spring.

2. A baby chair for a wheeled cycle comprising a board disposed on said wheeled cycle and including a front portion and a rear portion, said front portion of said board including a hook for engaging with a rack of said wheeled cycle, a catch pivotally secured to said rear portion of said board, and means for biasing said catch to engage with said rack so as to secure said board on said rack, a chair body including a bottom surface having a front portion pivotally coupled to said board and having a rear portion, and means disposed between said rear portion of said board and said rear portion of said chair body for cushioning said chair body in order to absorb shocks and vibrations transmitted to said chair body.

3. A baby chair according to claim 5. wherein said board includes an upper portion having a handle pivotally supported thereon, and a lower portion having a panel pivotally secured thereto and fixed to said handle such that said handle and said panel rotated in concert, said panel is rotated to engage with said rack by said handle so as to secure said board to said rack.

4. A baby chair according to claim 6, wherein said board includes two stubs oppositely extended upward and downward therefrom, said handle and said panel are rotatably engaged with said stubs respectively said board includes two grooves oppositely formed therein and having a curvature center located at said stubs, and two pins fixing said panel to said handle and slidably engaged in said grooves such that said handle and said panel rotated in concert.

* * * * *